F. W. G. BRUHN.
TACHIMETER.
APPLICATION FILED APR. 28, 1916.

1,306,046.

Patented June 10, 1919.
4 SHEETS—SHEET 1.

Inventor:
Friedrich Wilhelm Gustav Bruhn

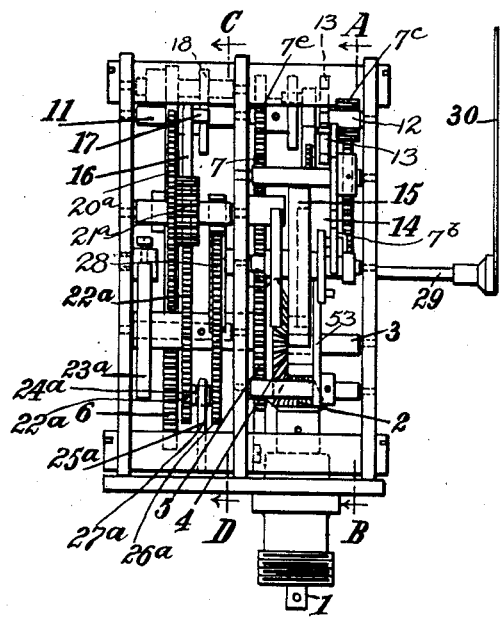
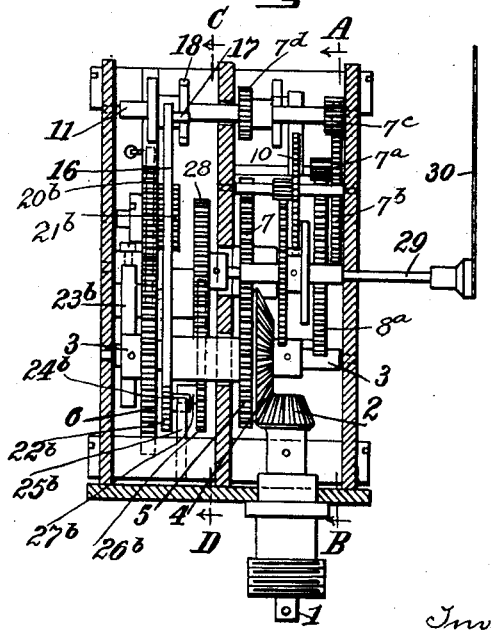

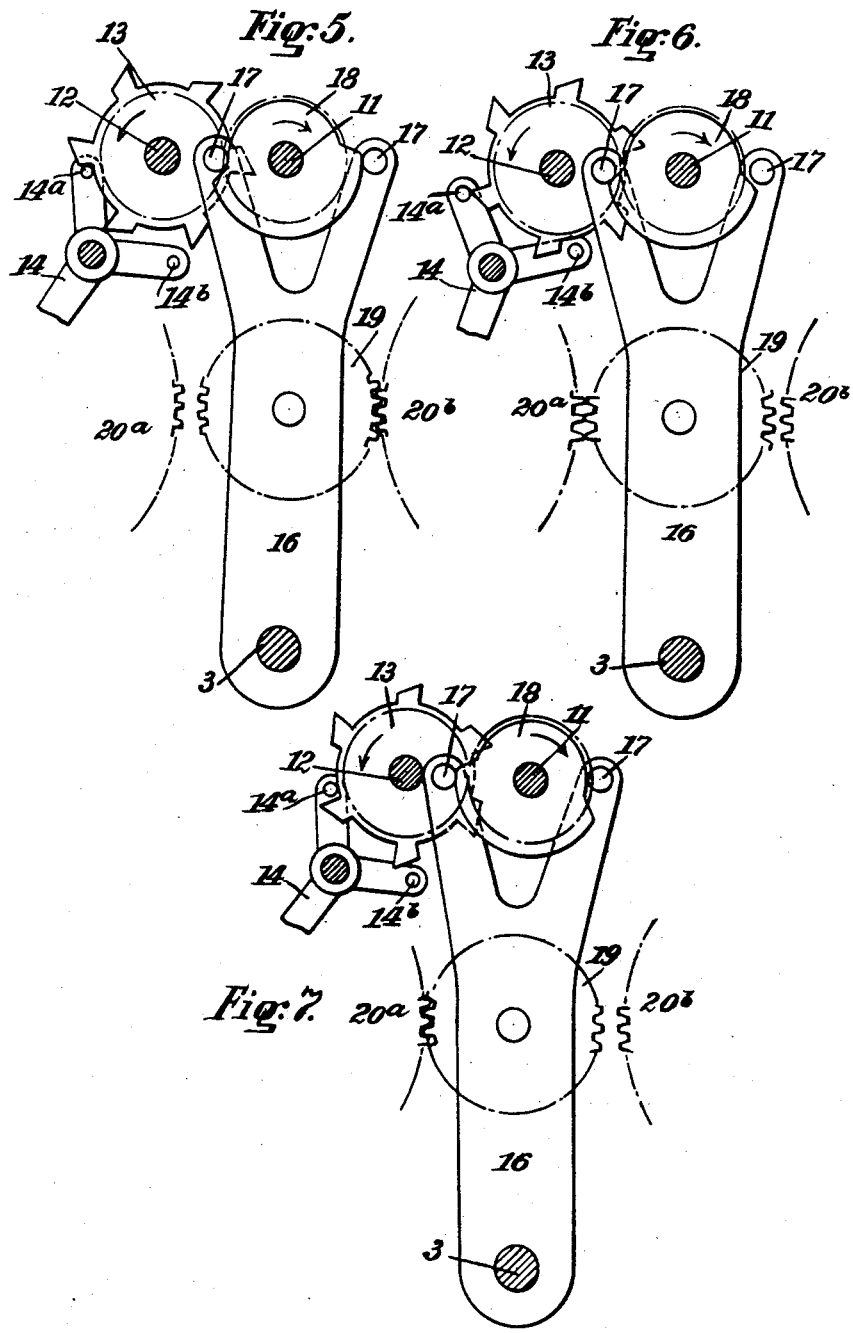

F. W. G. BRUHN.
TACHIMETER.
APPLICATION FILED APR. 28, 1916.

1,306,046.

Patented June 10, 1919.
4 SHEETS—SHEET 4.

Inventor:
Friedrich Wilhelm Gustav Bruhn

UNITED STATES PATENT OFFICE.

FRIEDRICH WILHELM GUSTAV BRUHN, OF BERLIN, GERMANY.

TACHIMETER.

1,306,046.          Specification of Letters Patent.     Patented June 10, 1919.

Application filed April 28, 1916. Serial No. 94,251.

*To all whom it may concern:*

Be it known that I, FRIEDRICH WILHELM GUSTAV BRUHN, a citizen of the German Empire, residing at Berlin, in the Kingdom of Prussia, German Empire, have invented new and useful Improvements in Tachimeters, of which the following is a specification.

The present invention relates to tachimeters for measuring the speed directly, that is to say, tachimeters, for measuring and indicating in periodically successive measuring periods of a short and accurately equal duration, the distance covered during each measuring period or the angular rotation of a shaft during each measuring period. The speed indicated according to this method, after the expiration of a measuring period, is the mean of the speeds which have occurred during the said measuring period. The speed indication itself is not continuous but periodical. In order that the speed indicated shall differ as little as possible from the actual speed existing at the moment of the indication, and in order that the periodical indication approaches a continuous indication as closely as possible, the measuring periods must be made as short as possible.

In tachimeters of this kind the indicating gear has to be coupled to the measuring gear for the duration of each individual measuring period. The measuring period is equal to the coupling period, and the accuracy of the measuring depends on the equality or uniformity of the measuring periods. It is therefore necessary to perform the coupling and uncoupling in a reliable manner and within the shortest space of time available. Furthermore, it is necessary that the engaged coupling be locked automatically in such engaged position, so that the coupling cannot be prematurely disengaged by any vibrations, such as will occur on vehicles fitted with tachimeters. The work to be performed by the clock work for engaging, disengaging and locking the coupling should not put too great a load on the said clock work. On the other hand the coupling and uncoupling must, in view of the necessary rapidity, be performed with a sufficiently strong force. The tachimeter should have a large range, and should, for example, be able to indicate speeds of vehicles up to 160 km. This large range should, however, not be obtained at the cost of a high "indication fault", as is the case with the tachimeters heretofore disclosed, and although the tachimeter is to have a large range the indication fault shall be nevertheless very small and be still further decreased when the device is adjusted or set to a smaller range. The functioning of all measuring members must be insured. The device must not be subject to any rapid wear, and should, on the contrary, be of a long life. The tachimeter may be constructed in ordinary clock factories and by the usual methods employed in clock manufacture and at comparatively low manufacturing costs.

In tachimeters of the type described the pointer indicating the speed is set by means of a driving gear which is coupled during the measuring period with the driving shaft by means of a coupling controlled by a clock work. This coupling is preferably reversed by the clock work during the interval between two successive escapements of the said clock work. Before the next measuring period commences the coupling must be disengaged and the controlling or switching gear returned into its initial position. This controlling gear is as a rule constructed in the form of a driving wheel which is coupled during the measuring period to the driving shaft, thereupon disengaged therefrom and returned by means of a spring until a pin, or the like, thereon strikes against a fixed stop.

According to the present invention the members serving to couple the driving wheel with the indicator are not operated by aid of any elastic intermediary means, but are operated directly and positively from the main spring of the clock work controlling the measuring operations. The clutch mechanism is held locked in its engaged position from the moment the meshing of the teeth has commenced up to the next disengagement.

This arrangement affords a number of important advantages. The said locking prevents the clutch members from becoming prematurely disengaged by shocks or vibrations. It further allows of engagement and disengagement of the spur gears employed for coupling, which would otherwise not be possible, for when spur gear couplings are used there will be added to the vibrations which tend to disengage the coupling and produce pushing strains, the lateral pressure of the teeth, which will likewise tend to disengage the coupling. Furthermore by the use of spur gears the spur gear serving as a coupling member need not be returned each time the parts serving to set up the pointer are returned. The returning movement of the said parts must be performed within a very short space of time but in view of the rebounding effects only a comparatively weak spring can be employed for such returning. It is therefore necessary to reduce the frictional resistances and accelerating resistances during such return of the parts. It is therefore of importance that the coupling gear, which would receive the highest speed or acceleration, does not participate in this movement. In consequence thereof the "driving wheel" that is the gear from which the coupling wheel is disengaged may receive a considerably higher circumferential velocity. The size of the "indication fault" depends directly on the circumferential velocity at the coupling point, or on the number of teeth passing the coupling point during the measuring period. This indication fault is of the same absolute value with all speeds to be measured. It is equal to the distance covered by the vehicle during the passage of one tooth at the coupling point or equal to the angle through which the shaft, the speed of which is to be measured, turns during the same time. The greater the number of teeth, which during a measuring period pass at the coupling point the smaller is the ratio of the indication fault. By the present new arrangement, the indication fault may be considerably reduced. The employment of a spur gear coupling allows, in a most simple manner, the coupling wheel to engage alternately with two different driving wheels, and thereby have the pointer set alternately by two different pointer setting gears and rendering the measuring periods successive to each other without any interruption.

With tachimeters of the kind described the measuring periods may be of a comparatively short duration, for example one second or less. The returning of the driving gear must also require but very little time. When the driving gear is swung back against its fixed stop, it will be observed that owing to the jerking back or rebounding action the driving gear will be again switching from its initial position, and when a new measuring period commences said switching gear will not be in its initial position proper. This will result in a false measuring and a false indication, as the indicated speed will be too high. The fault will correspond to the distance, which the driving gear rebounded from its initial position at the commencement of the measuring period. As a further consequence of this rebounding, the pointer does not stand quiet even when the speed is constant, but is subject to violent oscillations, because the rebound will naturally not always be the same.

According to the present invention this trouble is obviated by the switching gear being secured in its initial position against such rebounding, while the return of the driving gear into its initial position up to its stop is not prevented.

With tachimeters of the kind described, the main clock spring is, as a rule, automatically wound up by the shaft, the speed of which is to be measured. A clock spring is generally employed, the inner end of which is secured to the spring case spindle, while the outer end is not attached to the inner side of the spring case, but merely drags on it.

It has been found that with such arrangements, the spring frequently breaks.

According to the present invention this drawback is obviated by a peculiar arrangement of the said main spring.

The device is further fitted with an arrangement to prevent the clock work from running down, when the shaft under examination is running at such speed that it winds the main spring at a slower speed than it is unwound by the running off of the spring case.

Furthermore after each stop of the revolving shaft and the stopping of the clock work caused thereby, the clock work shall instantly and reliably be restarted as soon as the shaft under examination again commences to revolve.

Lastly means are provided to prevent the revolving shaft from driving the pointer while the clock work is at rest.

This arrangement consists essentially in locking the clock work, preferably by trapping the balance close to its reversing point, as soon as the winding spindle of the spring case, driven by the shaft under examination, runs slower than the spring case. The balance is trapped only after the coupling of the measuring gear has been disengaged and the balance is again released when the main spring has been sufficiently wound.

In the accompanying drawings.

Figure 2:
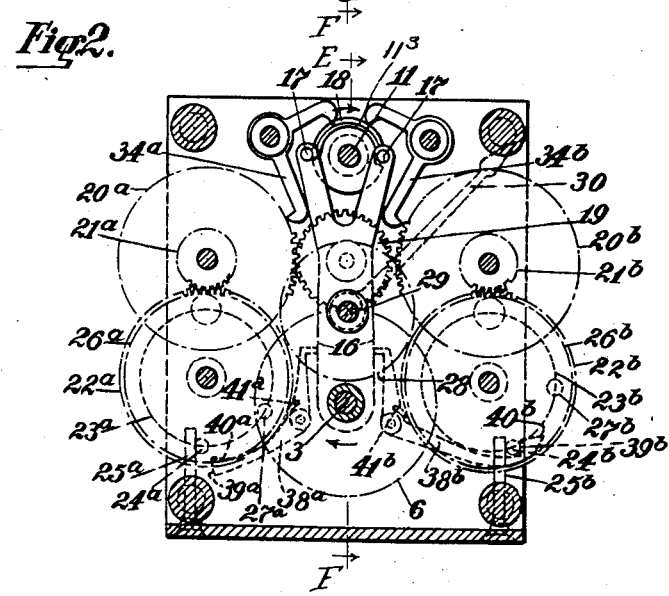
Fig. 2 is a front elevation of the same tachimeter in section along the line C—D in Figs. 3 and 4.
Figure 2A:
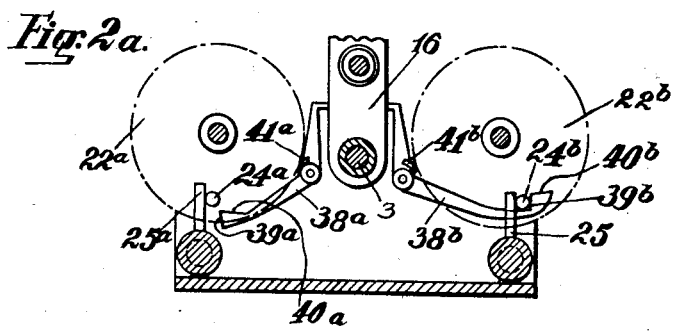

Fig. 2ᵃ shows the parts serving to prevent the rebound of the driving wheels; the said parts having for sake of greater clearness, been drawn on a larger scale.

Figure 1:
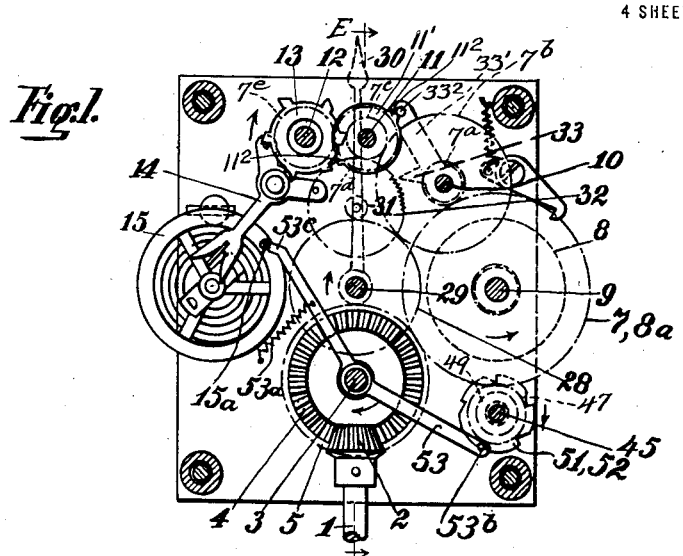
Figure 1 is a front elevation of the tachimeter in section along the line A—B in Figs. 3 and 4.

Fig. 3 is a side elevation viewed from the left of Figs. 1 and 2.

Fig. 4 is a vertical central section on the line E—F of Figs. 1 and 2.

Figs. 5, 6 and 7 show on an enlarged scale the coupling and its controlling means in various positions.

Figure 8:
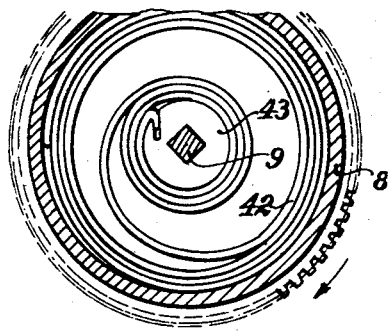

Fig. 8 is a spring case with a drag or sliding spring of the ordinary kind.

Figure 9:
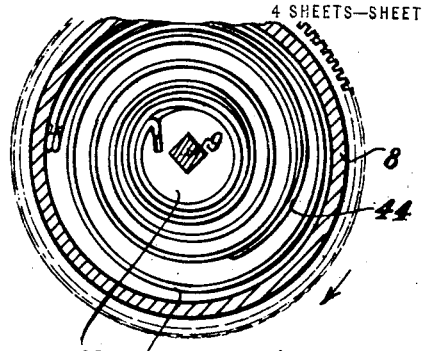

Fig. 9 shows the same spring case with an improved drag spring according to the present invention.

Figure 10:
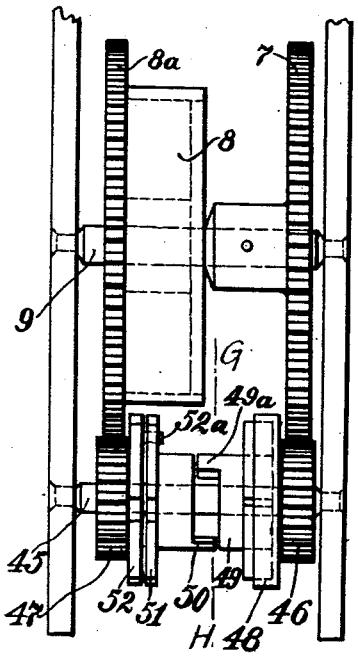
Figure 10C:
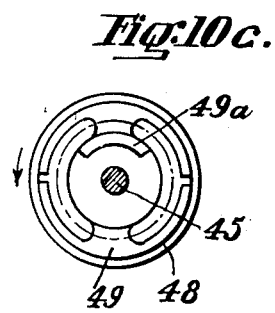
Figure 10A:
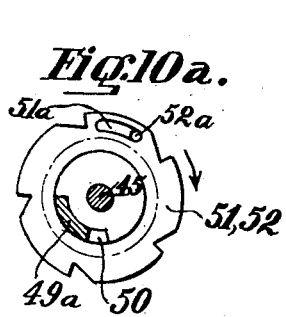
Figure 10B:
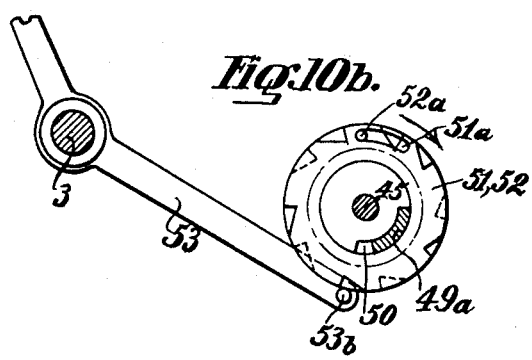

Fig. 10 is a side elevation, on a larger scale, showing the arrangement for preventing a complete running down of the clock work and for securing a reliable starting of the clock.

Figs. 10$^a$, 10$^b$ and 10$^c$ are sections on the line G—H in Fig. 10.

Figs. 10$^a$ and 10$^b$ are sections seen from the right at different relative positions of the eccentric wheels.

Fig. 10$^c$ is a section seen from the left.

The driving shaft 1, which is driven by the wheel of the vehicle the speed of which is to be measured, or by a shaft the revolutions of which are to be measured, carries a miter pinion 2 which meshes with a miter gear 4 on a shaft 3. On the said shaft 3 are fixed two spur gears 5 and 6, the one 5 driving the time mechanism, and the one 6 the indicating mechanism controlled by the time mechanism.

The spur gear 5 meshes with the winding gear 7 which is attached to the spring spindle 9 (Fig. 8). The inner end of the spring is attached to a hub 43 on the spring spindle 9. The outer end of the spring drags in known manner along the inner wall of the spring case 8, so that by the turning of the spring spindle the spring will be wound up to a certain maximum tension, which will remain constant if the spring is still further wound. This tension of the spring suffices to drive the clock work for a brief period, for example one to two minutes. The rotation of the spring drum 8 is transmitted in known manner via the shafts 10 and 11 to the escapement wheel by a suitable gear train as follows:—Spring drum gear 8$^a$ meshes with a pinion 7$^a$ on shaft 10 that carries a gear wheel 7$^b$ which in turn drives a pinion 7$^c$ on a shaft 11. This shaft also carries a larger pinion 7$^d$ that meshes with a like pinion 7$^e$ on the escapement shaft 11 carrying the escapement wheel 13. This wheel 13 is intermittently stopped by the escapement consisting of the escapement wheel 13, the anchor 14 and the balance 15. In the constructional form shown it has been assumed that the balance will make five oscillations a second. The escapement wheel has six teeth. The ratio of gearing between the escapement wheel and the shaft 11, which serves as controlling shaft for the coupling, has been so chosen that this controlling shaft 11 will perform one revolution in two seconds.

The other spur gear 6 which is also fixed on shaft 3 transmits during the individual accurately limited measuring periods (the duration of which may be one second,) the rotation received from the driving shaft 1 to the indicating mechanism and thereby measures the distance covered or measures the angular rotation during one second, which is equal to measuring the speed. The gear 6 will therefore hereinafter be termed the "measuring wheel." On the measuring wheel shaft 3 is rockingly mounted the coupling lever 16, Figs. 2, 2$^a$, 5, 6 and 7. The free end of this lever is forked and carries two pins 17, which engage with a cam 18 fitted to the controlling shaft 11. On the coupling lever 16 is rotatably mounted the coupling wheel 19, which is in permanent engagement with the measuring wheel 6 and may by rocking the lever 16 alternately engage with either of two gears 20$^a$ and 20$^b$ arranged to its right and left, respectively. By means of these gears 20$^a$, 20$^b$ the speed indicator is alternately set. This is effected from both gears in the same manner and with the same means, so that hereinafter only the transmission of the motion from the one gear will be described. The gear 20$^a$ is attached to the pinion 21$^a$, which meshes with the setting wheel 22$^a$, Fig. 2. This setting wheel 22$^a$ is returned into its initial position after each measuring period by means of a spring 23$^a$ which returns the wheel 22$^a$ until a pin 24$^a$, fitted in this wheel, strikes against a fixed stop pin 25$^a$. On the shaft of the wheel 22$^a$ is loosely fitted a wheel 26$^a$, which carries a pin 27$^a$, which may be dogged by pin 24$^a$. The wheel 26$^a$ meshes with the pointer wheel 28 on the pointer shaft 29 (Figs. 2, 3 and 4). On the pointer shaft 29 is fitted the pointer 30. The pointer wheel 28 meshes with a pinion 31 (Fig. 1) on the shaft of which is fitted a spring (not shown) for returning the pointer 30 into its zero position and with a ratchet wheel 32 with fine teeth. This ratchet wheel 32 is engaged by a pawl 33, which is lifted by the controlling shaft at the proper moment. This is effected in such a way that two cam surfaces 11$^2$, on the circumference of a disk 11' keyed on the controlling shaft 11, act alternately upon a lateral pin 33$^2$ carried by a pivoted lever 33' which is rigidly connected to the pawl 33. The ratchet wheel 20$^a$ is engaged by a pawl 34$^a$, which is lifted at the proper moment by an eccentric 11$^3$ Fig. 2 fitted to the controlling shaft 11.

By means of the just described arrangement the pointer is set by the wheel 20$^a$ (and in the subsequent measuring period in the same manner by wheel 20$^b$) in the following way:

Let it be assumed that the pointer 30 has just been set by the wheel 20$^b$ and that the parts are situated between the latter and the pointer in a manner corresponding to the last measuring period. The pawl 33 is in engagement with the ratchet wheel 32 of the pointer. The returning spring on the shaft of pinion 31 can therefore not return the pointer, and the wheels in engagement with the pointer wheel, namely wheels 26$^a$ and 26$^b$, and the pins 27$^a$ and 27$^b$, respectively, fitted to these wheels remain in their respective positions, corresponding to that of the pointer. The measuring period of wheel 20$^a$ has not yet commenced. The pawl 34$^a$ is lifted. The setting wheel 22$^a$ is now drawn by its spring 23$^a$ into its initial position, released from its pawl 34$^a$, and has thereby also returned the wheel 20$^a$ correspondingly. Now the cam 18 causes the coupling lever 16 to move the coupling wheel 19 into engagement with the wheel 20$^a$ for the length of one measuring period, which in the present constructional form is for the length of one second. The switching wheel 20$^a$ and the setting wheel 22$^a$, driven by it by means of pinion 21$^a$, are therefore advanced a distance corresponding with the distance covered during the measuring period or the angular rotation of the shaft, the speed of which is to be measured. The pin 24$^a$ (Fig. 2), which was in its initial position, that is, was lying against the fixed stop pin 25$^a$, is advanced through the same angle as the setting up wheel 22$^a$. If the speed during this measuring period is higher than that during the preceding measuring period, the pin 24$^a$ will abut against the pin 27$^a$ and dog the latter during the latter part of its travel. The loose wheel 26$^a$ is advanced correspondingly and turns also the pointer wheel 28 and the pointer 30, as the advancing of the pointer is not prevented by the ratchet wheel 32 and the pawl 33. By such advance of the pointer wheel 28 the wheel 26$^b$ and the pin 27$^b$ are correspondingly advanced. At the end of the measuring period the pointer will already indicate the new speed.

If the speed has not changed with regard to that of the preceding measuring period, the dog pin 24$^a$ will be advanced exactly up to the pin 27$^a$. The wheel 26$^a$, the pointer wheel 28, the pointer 30 and the wheel 26$^b$ are not turned. The pointer will continuously show the same unchanged speed.

If the speed has dropped as compared to that of the preceding measuring period, the dog pin 24$^a$ will remain in its terminal position at a corresponding distance behind the pin 27$^a$.

Immediately after completion of the measuring period the coupling wheel 19 is disengaged from the wheel 20$^a$, and at the same moment the pawl 34$^a$ engages and holds the wheel 20$^a$. Thereupon the pawl 33 of the pointer ratchet wheel 32 is lifted for a moment. In case the speed decreased in comparison with the speed in the last measuring period, the pointer 30 will be drawn back by the pointer spring reversely rotating pointer wheel 28 and loose wheels 26$^a$ and 26$^b$ in mesh therewith until the pins 27$^a$ and 27$^b$ abut against the dog pins 24$^a$ 24$^b$. Thereupon the pawl 33 is immediately reëngaged and now the pawl 34$^a$ is lifted so that the setting up wheel 22$^a$ and the wheel 20$^a$ may be returned by the returning spring 23$^a$ into their initial positions.

In the same manner the operations are performed which correspond to the advance and return of the wheel 20$^b$.

In Figs. 5, 6 and 7 is shown, on an enlarged scale, in what manner the coupling lever 16 is controlled by the clock work.

In Fig. 5 the anchor pin 14$^a$ is in engagement with a tooth of the escapement wheel 13, and that the balance 2 (not shown) is just about to lift the anchor pin. The cam 18 is in the position shown. When now the anchor pin 14$^a$ is lifted by the balance (see Fig. 6) the cam 18 will be rapidly turned in the direction of the arrow by the clock work which at present is not held. The one cam face of cam 18 will strike against pin 17 and turn the coupling lever 16 first into its intermediate position, so that the coupling wheel 19 (see Fig. 6) will not be in mesh with either wheel 20$^a$ or with wheel 20$^b$. If the teeth of the coupling wheel 19 are exactly opposite the gaps between the teeth of wheel 20$^a$, the coupling lever 16 can be immediately thrown over completely to the left into the position shown in Fig. 7. If, however, at the moment the ends of the teeth of the coupling wheel are opposite the teeth of the wheel 20$^a$, the coupling lever 16, cam 18 and escapement wheel 13 will for a brief moment remain in the position shown in Fig. 6, namely until the coupling wheel 19 has turned so far, that an engagement is possible. The time which is necessary therefor is very short owing to the large number of teeth of wheel 20$^a$ passing the coupling point during each measuring period. Even at the lowest speed, which might come into question for measuring, say at a speed of only 5 kilometers per hour, the "indication fault" may practically be neglected. This indication fault is of the same absolute value for all speeds, and will therefore at higher speeds be relatively smaller.

The retardation in the engagement of the coupling wheel is rendered possible by the control, as the coupling lever 16, cam 18 and escapement wheel 13 need be moved into the position shown in Fig. 7 only shortly before the anchor pin 14$^b$ will be again lifted. Therefore, in the constructional form shown, almost one fifth of a second will be available. Of this available time, however, even in the most unfavorable case and at a very low speed, only a small fraction will be used.

Immediately after completion of the engagement and immediately after the completion of the disengagement of the coupling wheel the coupling lever 16 is automatically locked by the cam 18. This has the object to prevent with absolute certainty a premature disengagement or a premature engagement of the coupling wheel 19.

The arrangement for preventing a complete running down of the clock work, or for insuring the arresting and releasing of the clock work at the proper moment (see Figs. 1, 10, 10ª–10ᶜ) is as follows:

The winding wheel 7 which is fixed on to the spring spindle 9 and the spring case wheel 8ª, of the same size and loose on the spring spindle 9 engage with two pinions 46 and 47, respectively, fixed to a shaft 45 disposed parallel to the spring spindle 9. The pinion 46 is connected with an annular flange 48, in which an elastic slip ring 49 engages, and tends, on being turned, to carry the slip ring 49 along with it. The slip ring 49 has a projection 49ª having the shape of a ring sector. In the range of this projection 49ª is disposed a nose 50, which is attached to the hub of a cam wheel formed as a ratchet 51 loosely mounted on the shaft 45. A second cam wheel formed as a ratchet wheel 52 congruent with the eccentric wheel 51 is rigidly attached to the pinion 47. The two eccentric wheels 51 and 52 are rotatable relatively to each other within a given angle between two terminal positions. At the one terminal position (see Fig 10ª) the gaps between the teeth of the two wheels register and the two wheels act as a single ratchet. At the other terminal position (see Fig. 10ᵇ) the gaps between the teeth of the one wheel are out of register with the teeth of the other wheel and the two wheels then form a circular periphery. The relative movement of the two wheels 51 and 52 is limited by a pin 52ª attached to wheel 52, and engaging in a slot 51ª in wheel 51. On the shaft 3 (see Fig. 1 and 10ᵇ) is pivoted a double-armed lever 53, which is under the action of a spring 53ª. The right arm of this lever 53 carries a pin 53ᵇ which may be held by the cam wheels 51 and 52 in opposition to the action of the spring 53ª in the disengaged position shown in Fig. 10ᵇ by the circular periphery formed by the two wheels when out of register. When the teeth of the two wheels 51 and 52 register exactly, the pin 53ᵇ urged by the spring 53ª will, when the wheels 51 and 52 are rotated, enter into the next gap between the teeth of wheels 51 and 52. The lever 53 is then rocked, the end 53ᶜ of the left arm of lever 53 will move into the path of a pin 15ª connected to the balance and will arrest the latter close to its reversing point. When the end of the lever 53 is again cammed from the path of the pin 15ª, the clock will again begin to run. As will be seen from Fig. 1 both the shaft 45, which controls the arresting lever, and the cam shaft 11, which controls the coupling lever 16 (see Fig. 2) are driven from the spring case wheel 8ª. The ratio of gearing is so chosen that at the moment when the pin 53ᵇ can drop into a gap in the wheel 52 and thereby arrest the balance 15, the cam shaft 11 has such a position that the coupling lever 16 is in its intermediate position, and the coupling wheel 19 is disengaged from both wheels 20ª and 20ᵇ. It will thus be seen that the clock cannot be stopped while the coupling is engaged, and that after the clock has been stopped the indicating gear may return into its zero position.

The operation of the arrangement is as follows: Assuming the shaft 1 under examination is revolving at such a speed that the winding wheel 7 will revolve faster than the spring case wheel 8ª. In consequence thereof also the pinion 46 will revolve faster than the pinion 47. The pinion 46 will seek to shift the slip ring 49 along with it. The ring sector like projection 49ª of the slip ring 49 will abut against the nose 50 of the eccentric wheel 51 and will displace the latter relatively to the wheel 52 until it assumes the position shown in Fig. 10ᵇ, i. e. until the left end of the slot 51ª meets up against the pin 52ª and the pin 53ᵇ on the lever 53 is simultaneously cammed from the notches in wheel 51 to release the escapement. The cam wheel 51 and the slip ring 49 can follow the rotation only at the same rotary speed of the pinion 47 under the control of the spring drum. Owing to the faster rotation of the pinion 46 the annular shoulder 48 will glide on the elastic slip ring 49. As the winding wheel 7 and the spring shaft 9 revolve faster than the spring case 8, the outer end of the main spring will continuously slide on the inner wall of the spring case 8, while the main spring will retain its maximum tension.

On the other hand, if the speed of the revolving shaft 1 sinks either to 0 or at least so far that the winding wheel 7 revolves slower than the spring case wheel 8ª. In consequence thereof the pinion 46 will revolve slower than the pinion 47. The projection 49ª of the slip ring 49 will now drop behind the nose 50 of the eccentric wheel 51, namely so far as the available play will allow. (In the constructional forms shown in Fig. 10, 10ª⁻ᶜ this play would amount to an angle of about 180°.) Now the slip ring 49 and the cam wheel 51 lag behind until the pin 52ª of the wheel 52 has traversed the slot 51ª of the wheel 51 and reached the opposite end of the said slot (see Fig. 10ª). At this position the two wheels 51 and 52 are in such a position that their gaps register exactly. On a further rotation taking place the wheel 51 and the slip ring 49 must follow owing to the faster rotation of the wheel 52 (or the pinion 47, respectively). As soon, however, as the next gap of wheels 51 and 52 reaches to the pin $53^b$, the latter can engage into the said gap. The lever 53 moves with its end $53^c$ into the path of the balance pin $15^a$, and the balance is arrested close to its reversing point. As hereinbefore stated owing to the ratio of the gearing, the coupling wheel 19 is disengaged at the same moment that the balance 15 is arrested, and the whole clock work is stopped. Therefore the indicating gear, and in particular the pointer 30 can return into their zero position.

We may now assume that after the shaft 1 under examination has been at a stop, it again commences to revolve. At first the clock is still arrested. This arresting of the clock is released only after the winding wheel 7 has turned through a given angle, and thereby has wound up the main spring by such angular rotation. The angular rotation of the pinion 46 corresponding to such necessary angular rotation of the winding wheel 7 is composed of the play of the projection $49^a$ relatively to the nose 50 and of the play of the pin $52^a$ in the slot $51^a$. When the pinion 46 has performed this angular rotation, the eccentric wheels 51 and 52 will be again in the non-registering position as shown in Fig. $10^b$. The pin $53^b$ is cammed out of its notch, the balance is released and, as the latter had been arrested close to its reversing point, it immediately begins to oscillate again.

While the clock is running the spring tension is maintained almost constant. The tension of the spring may drop from its maximum produced by the friction of the outer end of the spring against the inner wall of the spring case only by the sum of the plays between $49^a$ and 50 on the one hand, and between $52^a$ and $51^a$, on the other hand.

The measuring gear hereinbefore described has the disadvantage, that the initial position of the setting wheel $22^a$, which is driven by wheel $20^a$, is not positively insured. By the returning of the wheels $20^a$ and $22^a$, and by the abutting of the pin $24^a$ against the stop pin $25^a$ rebounds will be produced, which will cause the wheels to run backward and oscillate to and fro several times. In consequence thereof, it may occur that at the commencement of a fresh measuring period, or when the coupling wheel 19 is engaged with the wheel $20^a$, the setting wheel $22^a$ is not in its initial position proper. The setting up wheel $22^a$ will then, during the measuring period, be advanced too far and the pointer will accordingly read a too high speed.

According to the present invention a pawl $38^a$, $38^b$ is provided for each ratchet gear, said pawls being controlled by the coupling lever 16 (see Figs. 2 and $2^a$). One end of each pawl is provided with an abutting surface $39^a$, $39^b$ for receiving the stop pin $24^a$, $24^b$ carried by the setting wheel $22^a$, $22^b$.

When, at the end of a measuring period, a ratchet wheel with the respective setting wheel, say the wheels $20^a$ and $22^a$, return into their zero position, the pin $24^a$ will strike against the bevel surface $40^a$ of the pawl $38^a$ and force back the pawl. Immediately thereafter the spring $41^a$ forces the pawl upward again so that the surface $39^a$ moves into the path of pin $24^a$, which is then securely held between the abutment $25^a$ and the surface $39^a$. This insures a guarantee that the wheels $20^a$ and $22^a$ cannot be moved by rebounding from their zero position.

This locking action must be again suspended before the measuring wheel and the setting wheel are reset afresh.

When the coupling lever 16 reëngages the coupling wheel 19 with the wheel $20^a$, it, at the same time, pushes the pawl $39^a$ aside and again releases the pin $24^a$. At the moment of the uncoupling the spring $41^a$ draws the pawl back into its locking position, so that the process described is repeated.

In exactly the same manner the pawl $38^b$ acts with regard to wheel $20^b$ and setting wheel $22^b$.

As hereinbefore described the coupling lever 16 is controlled by cams on shaft 11.

For showing in what manner the breaking of the main spring may be avoided, a spring case is shown in Fig. 8 containing a drag spring of the usual kind, and in Fig. 9 is shown a drag spring improved according to the present invention.

In Fig. 8, the numeral 8 indicates the spring case, 9 is the spring case spindle, 42 the spring, 43 the drum of the spring case, to which the inner end of the spring is hooked. When, with the arrangement shown in Fig. 8, the spring 42 is wound up by the spring case spindle 9 being turned in the direction of the arrow faster than the spring case drum unwinds in the same sense, an ever increasing part of the main spring will be wound up on the drum 43 in close spirals, and a corresponding part of the spring will unwind from the close spirals which bear against the inside wall of the spring case. By several spirals of the outer end of the main spring lying close against each other, the radial forces exerted by the spring spirals are summed up and the outermost spiral will be forced with a correspondingly great pressure against the inside wall of the spring case. The friction between the main spring and the said inside wall of the spring case will be of a corresponding value. A further result is that the spring may be wound very far before the outer end begins to slip. At the moment, however, when by the further winding of the spring the outermost spirals are slightly loosened from each other, the pressure between the spring and the spring case wall is suddenly reduced. In consequence thereof the friction between the spring and case will accordingly drop suddenly. The torque exerted by the wound spring will, then become larger than the suddenly reduced frictional resistance. Consequently thereof the outer end of the spring shoots forward in the direction of the rotation by a larger angle of rotation, for example of one whole turn. The spring will receive a sudden shock. As these shocks may, under circumstances, be repeated more than one hundred times in the minute, the spring will, within a short time be destroyed by the violence.

According to the present invention these difficulties—that is to say the sudden drop in the friction between the spring and the spring case, the shooting forward of the end of the spring and the destructive effect of the repeated violent shocks on the spring— are avoided by suitable means being provided to maintain the pressure between the end of the spring and the wall of the spring case approximately constant.

In Fig. 9 a main spring embodying my improvement is shown. To the outer end of the spring 42 is riveted on its inner side a piece of a spiral spring 44 which forms at the riveting point an angle with the spring 42. The free end of this additional spring 44 bears against the next turn or winding of the spiral spring. When, now, the spiral spring is placed into its case, the one but last turn of said spring 42 will be held by the spring 44 at a certain distance from the last turn of the spring 42. By the spring 44 a radial pressure is exerted on the end of spring 42. This pressure will remain of approximately the same value, irrespective of the degree of winding. The small increase which the distance between the next to the last and the last turn of the spring will undergo during such winding of the spring, will result in a but trifling change of the radial pressure exerted on the end of the spring. As the radial pressure between the end of the spring and the inside of the wall of the spring case remains practically constant, the end of the spring will continuously follow the rotation of the spring case spindle, when the latter is turned faster than the spring case becomes unwound. By such arrangement the life of the springs is greatly prolonged.

I claim:

1. A tachimeter comprising two driving gears operating the indicating pointer, a coupling adapted to alternately couple each of said driving gears with the shaft to be examined during each measuring period and a clock work controlling said coupling, said coupling consisting of a pivoted lever, a pair of spaced pins thereon, a spur coupling wheel with fine teeth on said lever and means for rocking said lever to engage said coupling wheel alternately with said driving gears, a cam fitted on a shaft under the control of the escapement wheel of said clock work, said cam continually engaged on opposite sides by said pins, and a measuring wheel in constant engagement with said coupling spur wheel on said coupling lever in constant engagement with the measuring wheel.

2. In a tachimeter, a time mechanism wound from the shaft whose speed is to be measured, a pointer and a pointer wheel, a pair of gear wheels under spring action, an oscillating lever having coupling wheel thereon capable of meshing alternately with said wheels, means to transmit the partial rotations of said gear wheels to said pointer wheel, a cam controlled by the time mechanism to oscillate said lever, and mechanism partly operated from the shaft whose speed is to be measured and partly from the time mechanism to stop the time mechanism when the winding speed thereof is below driving speed.

3. In a tachimeter, a time mechanism, two pointer setting mechanisms and a clutch mechanism including a driven clutch element alternately moved into engagement with said pointer setting mechanisms by said time mechanism, and mechanism driven from the shaft whose speed is to be measured and controlled from the time mechanism or vice versa to stop the time mechanism when the winding speed of the time mechanism drops below that of its running speed, said stopping being at the period of disengagement of said driven clutch member from both of said pointer setting mechanisms.

4. In a tachimeter, in combination, a gear wheel, a spring retracted setting wheel, a pin on the latter wheel, a loose gear wheel, a pointer actuating wheel in gear with said loose wheel, a pin on said loose wheel in the path of the first mentioned pin, a fixed stop for said pin, and a clock mechanism controlled pawl to hold the first mentioned pin against said stop, thereby preventing the displacement of said spring retracted wheel by the jarring of the mechanism.

5. In a tachimeter, two gear wheels, a time mechanism, an oscillating lever, a clutch wheel on said lever driven from the element whose speed is to be indicated and moved by said time mechanism alternately into engagement with said gear wheels to drive them, a spring-retracted gear wheel indirectly geared to each of the aforesaid gear wheels, a pin on each of said spring-retracted gear wheels, a loose wheel co-axially mounted with respect to each spring-retracted wheel, a pin on each of the latter wheels in the path of the first mentioned pins, a fixed stop for each of said first mentioned pins and a pawl for holding each of the first mentioned pins against its stop, said pawls actuated by said oscillating lever, and a pointer actuating wheel in constant engagement with both of said loose wheels.

In witness whereof I have hereunto set my hand in presence of two witnesses.

FRIEDRICH WILHELM GUSTAV BRUHN.

Witnesses:
HENRY HASPER,
ALLEN I. JENNINGS.